Jan. 27, 1953     W. A. HUBER     2,627,068
RADIO SYSTEM
Filed July 6, 1944     5 Sheets-Sheet 1

*INVENTOR.*
WILLIAM A. HUBER
BY William D. Hall
*Attorney*

Jan. 27, 1953 W. A. HUBER 2,627,068
RADIO SYSTEM
Filed July 6, 1944 5 Sheets-Sheet 2
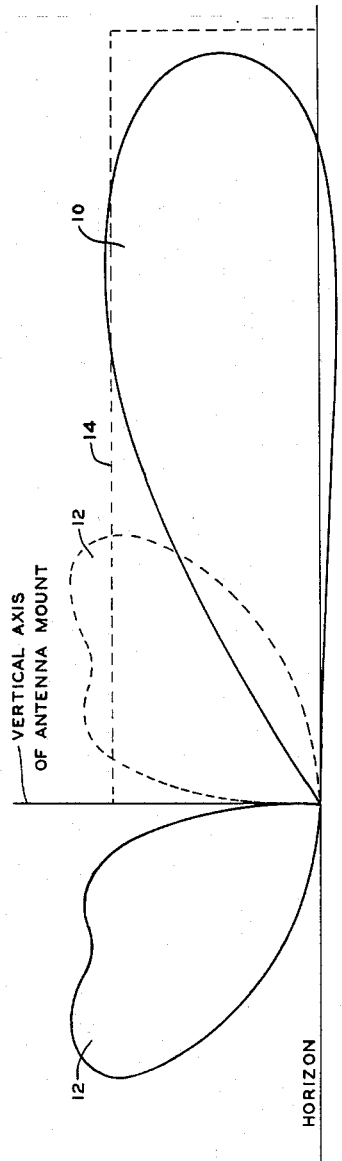
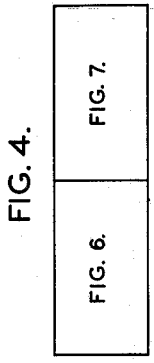
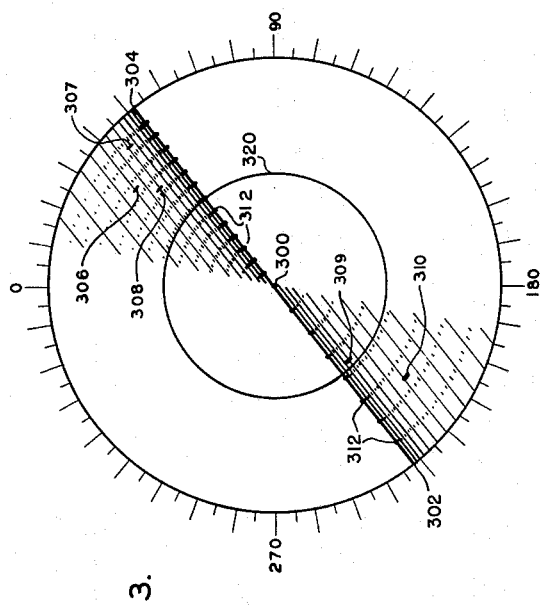
INVENTOR.
WILLIAM A. HUBER
BY William D. Hall.
ATTORNEY Jan. 27, 1953     W. A. HUBER     2,627,068
RADIO SYSTEM Filed July 6, 1944     5 Sheets-Sheet 3

*INVENTOR.*
WILLIAM A. HUBER

INVENTOR.
WILLIAM A. HUBER

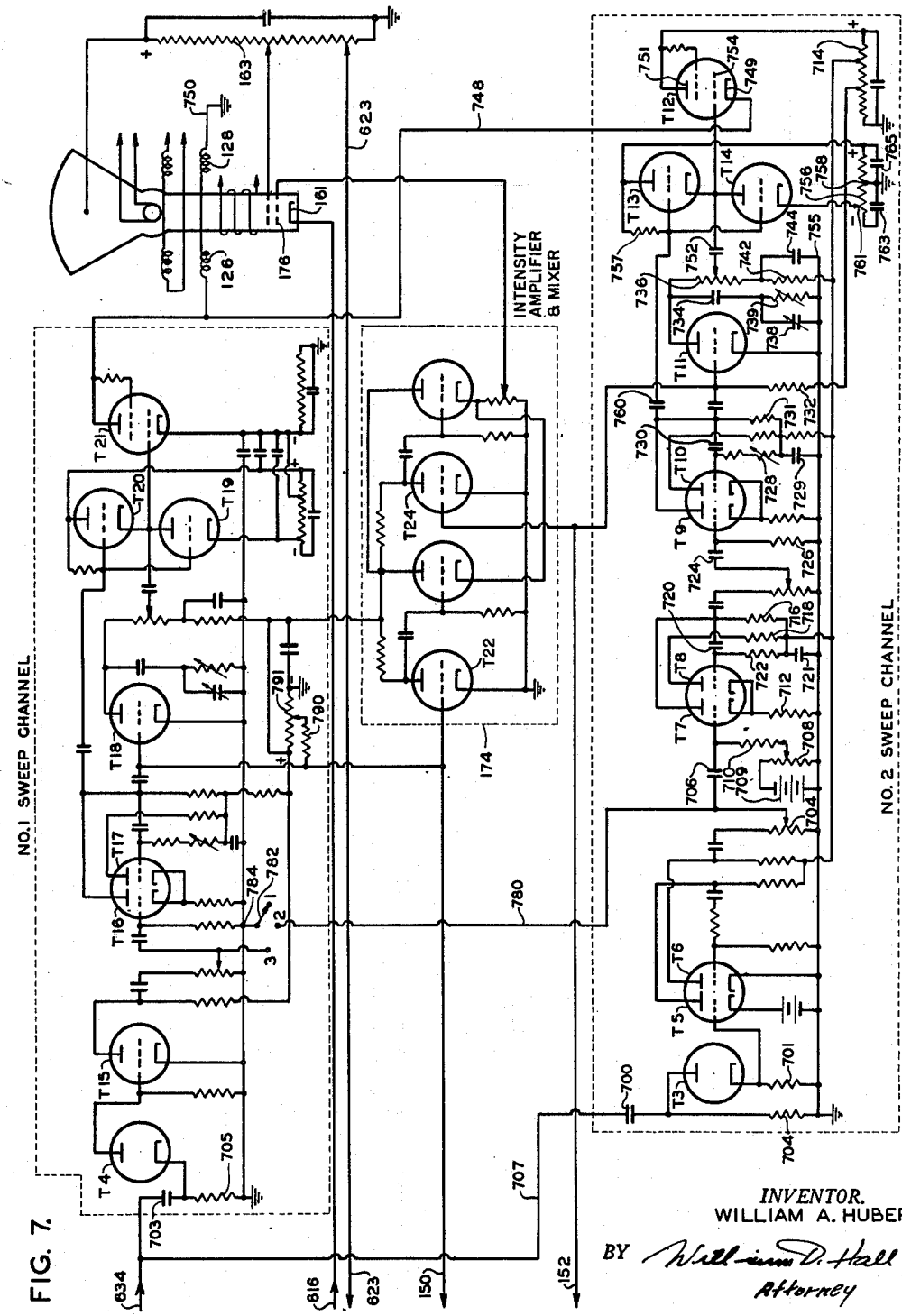

UNITED STATES PATENT OFFICE 2,627,068

RADIO SYSTEM

William A. Huber, Neptune, N. J.

Application July 6, 1944, Serial No. 543,745

18 Claims. (Cl. 343—11)

(Granted under Title 35, U. S. Code (1952), sec. 266)

The invention described herein may be manufactured and used by or for the Government for governmental purposes, without the payment to me of any royalty thereon.

This invention relates to radio locators, and more particularly to radio locators using a plurality of antennas, and a method and apparatus for reproducing images of signals received by the antennas on a screen of a single oscilloscope.

When radio locators are used for determining the position of airplanes in flight, because of high flying speeds of the airplanes, it is desirable to locate their presence and position as early, and as far away, from the radio locator as practicable, and, after once locating them, to follow their course with the radio locator until they reach the locator itself, should their course of flight be such as to coincide with the position of the radio locator. An idealized scanning beam of a system of this type should then comprise a vertically positioned rectangle with the horizontal side equal to the maximum range obtainable, such as 350 miles, and the vertical side equal to the maximum altitude attainable by the airplane, which is in the order of 40,000–50,000 feet. One lower corner of such imaginary rectangle should coincide with the position of the radio locator, the radio locator being the source of the scanning beam in the system of this type.

Since the state of the known art makes it impossible to obtain such scanning beam with a single antenna array, the most practicable method of accomplishing this result consists of using two antennas, one antenna being adapted to radiate relatively low ultra-high frequency, highly directional radio signals which form a first scanning energy lobe for obtaining the desired long range, and supplementing this long range lobe, or as it is sometimes called "an early warning lobe," with an additional lobe produced by the second antenna being adapted to radiate a higher ultra-high frequency signal for filling in that portion of the imaginary rectangle which remained unscanned by the early warning lobe. The approximate shapes of the two antenna lobe patterns accomplishing this result are illustrated in Fig. 2, lobe 10 being an early warning lobe pattern, and lobe 12 supplementing the early warning lobe by partially filling in the upper left corner of the imaginary rectangle 14.

The advantages of such arrangement reside in the optimum utilization of the obtainable lobe patterns, and of the available power, which results in minimum weight of the necessary equipment per unit of scanned area.

Since, as mentioned above, the present state of the art does not permit complete scanning of rectangle 14 with one antenna, and the sought result may be obtained only with two antennas, it becomes necessary to consider the optimum mode of mounting them on a rotating vertical shaft and a supporting tower. Because of the relatively large size of the antenna reflectors, they represent a large resistance to wind, this resistance being at a minimum when the two reflectors are mounted back-to-back, and the two lobes point in opposite directions, maximum wind loading being encountered when the two antennas are mounted one above the other, with both beams facing in the same direction.

The transmitting equipment in the radio locators of this type consists, as a rule, of a single modulator which keys simultaneously two transmitters, each transmitter being connected to its antenna, with the beam axes of the antennas pointing in opposite directions.

The receiving equipment in the system of this type consists of two duplexing circuits and two receivers, each receiver being connected through its duplexing circuit to the transmitting-receiving antenna. Each receiver is connected on its output side to its individual oscilloscope of a plan position type, which reproduces the received echoes on its screen along a polar coordinate system with the radio locator being located at the center of the polar coordinates. The position of targets is, therefore, indicated on the oscilloscope screen in terms of range and bearing. Except for the common modulator, the system, therefore, normally represents two complete transmitting-receiving channels. One of the reasons for using two separate oscilloscopes, one oscilloscope being connected to each receiver, is because of the desire to maintain the signal-to-noise ratio as high as possible. If the two receivers were connected in parallel to a single oscilloscope, the noise level impressed on a single oscilloscope would be approximately twice the noise level impressed on the oscilloscope by one receiver because of the law of random distribution of the noise signals. While the noise level would be thus doubled, the level of the useful echo signals would remain equal to the output level of one receiver because the lobe patterns of the two antennas overlap only to a limited extent, and because the amplitude limiting characteristics of the receivers would prevent any corresponding increase in the amplitudes of the useful signals. Accordingly, the known radio locators using two transmitting channels and two receiving channels for locating the objects also use two separate oscilloscopes, one oscilloscope for each channel, two operators to observe the location of the echo images on two separated oscilloscope screens, and some method of coordinating the information received individually by the two operators.

The invention proposes to eliminate the need for the two indicators and two operators by displaying the signals received from both antennas and the associated receivers on a single indicator without decreasing the previously mentioned signal-to-noise ratio.

According to the invention the output circuits of the two receivers are connected to a single oscilloscope through two electronic switches which alternately block the parallel connections between the two receivers and the oscilloscope so that only the output of one receiver is impressed on the oscilloscope tube at any given time. The oscilloscope itself is provided with a "bi-radial" sweep deflection which, like the well-known single radial sweep deflection, known as Plane Position Indicator, or PPI, originates at the geometric center of the polar coordinates and sweeps radially at uniform radial velocity toward the periphery of the oscilloscope tube while the deflection vector is being rotated around the center at a uniform angular velocity. The difference between the well-known radial sweep deflection and the bi-radial sweep deflection resides in the fact that in the bi-radial deflection every other succeeding radial deflection is 180 degrees out of space-phase on the screen of the oscilloscope with the deflection which preceded it, so that if, for example, radial deflection No. 1 extends from the center to north, the succeeding deflection extends from the center to south. Because the radial deflection velocities and the rate of keying are very large as compared to the angular rotation of the antennas, the two bi-radial deflection traces appear as a straight line on the oscilloscope screen bisecting it into two semi-circles, and the echoes are reproduced in their true range and azimuth positions on both traces since one trace constantly points in the direction of the lobe axis of one antenna, and the other trace points in the direction of the lobe axis of the other antenna. Because of this result this type of deflection will be referred to in this specification as a "bi-radial" deflection. For a more detailed description of PPI systems in general, and the application of the bi-radial deflection to radio locators with a single antenna, the reader is referred to a patent application Serial No. 518,934 by W. A. Huber and M. Gindoff, filed on January 20, 1944, now Patent No. 2,566,332, dated September 4, 1951.

It is, therefore, the principal object of this invention to provide a method and apparatus for operating a multi-antenna radio locator in connection with a single plan position indicator oscilloscope without any detrimental decrease in the signal-to-noise ratio.

Another object of this invention is to provide a plan position indicator connected to two receivers which alternately reproduces signals received by one receiver along one radial sweep trace, and signals received by the other receiver along the other radial sweep trace, the two traces pointing substantially in the opposite directions.

Still another object of this invention is to provide electronic switches between the two receivers and an oscilloscope circuit, the switches blocking the output of one receiver and then of the other receiver in synchronism with the duty cycles of said receivers.

Still another object of this invention is to provide means for synchronously operating a bi-radial sweep plan position indicator and a dual antenna radio locator so that the scanning results of one antenna are reproduced along one radial sweep trace and the scanning results of the other antenna are reproduced along the other radial sweep trace of said indicator.

The novel features which I believe to be characteristic of my invention are set forth with particularity in the appended claims. My invention itself, however, both as to its organization and method of operation, together with the further objects and advantages thereof, may best be understood by reference to the following description in connection with the accompanying drawings in which:

Figure 2 illustrates approximate shapes of the antenna lobes of the two back-to-back antennas illustrated in Fig. 1.

Figure 3 illustrates a bi-radial sweep trace pattern together with the images of the echo signals and marker signals as they appear on the screen of an oscilloscope tube.

Figure 4 illustrates the relationship between Figs. 6 and 7.

Figures 6 and 7 are the schematic diagrams of the bi-radial PPI oscilloscope, Fig. 7 forming a continuation of Fig. 6.

Figure 1:
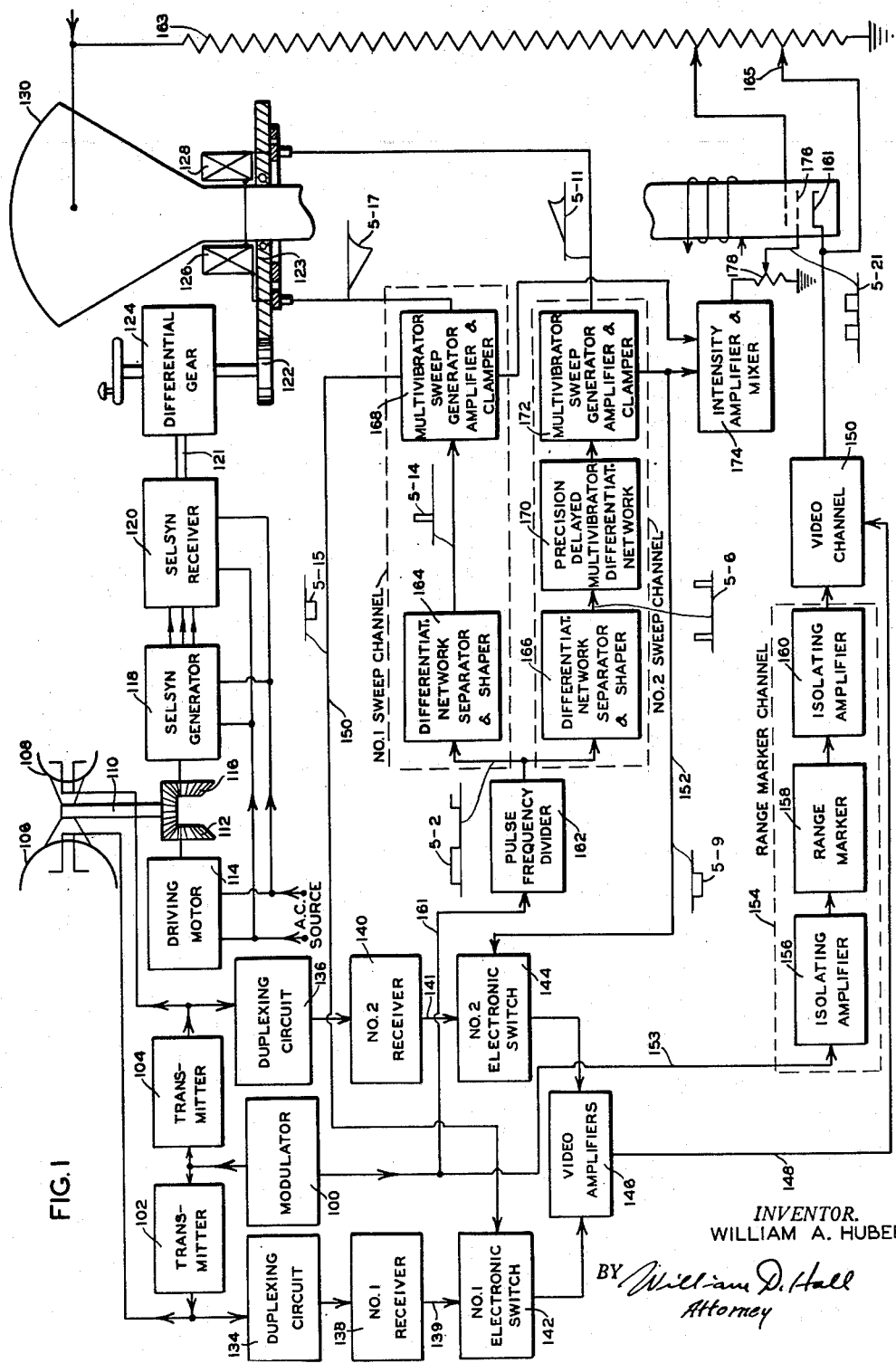
Figure 1 is a block diagram of a dual antenna radio locator connected to a bi-radial sweep oscilloscope circuit.

Referring now to Fig. 1, a modulator 100 simultaneously keys transmitters 102 and 104 which are connected to antenna arrays 106 and 108. As mentioned previously, these are the back-to-back antenna arrays with their lobe axes pointing in the diametrically opposite azimuth directions so that there is an angle of 180° between the axis of one lobe and the axis of the other. The antenna arrays are mounted on a vertical shaft 110 which is connected by gears 112 to a driving motor 114, and by means of a gear 116 to a "Selsyn" generator 118. The drawing indicates the antenna arrays 106 and 108 mounted on a vertical shaft 110 so that the lobe axes of both antennas are in a horizontal plane. This may not necessarily be the case, and, in order to obtain the optimum scanning results, either one of the lobe axes may be tilted upwardly with respect to the horizontal plane. The stator winding of the "Selsyn" generator is connected to the stator winding of a "Selsyn" receiver 120. Shaft 121 of the latter is connected through a differential gear 124 and a driving gear 122 to a driven gear 123. The deflection coils 126, 128 of the PPI oscilloscope tube 130 are secured to gear 123 which is mounted by means of ball bearings and an appropriate collar on the neck of the oscilloscope tube. The differential gear 124 is used for the initial alignment of the electromagnetic axis of the deflection coils 126, 128 so that the magnetic axis of the deflection coils 126 and 128 is parallel with the axes of the antenna array beams. The "Selsyns" arrangement revolves the deflection coils 126, 128 in synchronism with the rotation of the antenna arrays which insures proper azimuth indications on the screen of the oscilloscope tube 130. The driving motor and the "Selsyns" are all connected to a common source of alternating current in a conventional manner, as indicated in the figure.

Duplexing circuits 134 and 136 connect receivers 138 and 140 to their respective antenna arrays, and the outputs of these receivers are impressed on electronic switches 142 and 144. The electronic switches in turn are connected to a video amplifier 146, the latter being connected over a conductor 148 to a video channel 150. Since only one PPI oscilloscope, and only one cathode-ray beam, is used for the reproduction of the received signals on the same oscilloscope screen, the output of only one receiver may be utilized at any given time. Hence, the reason for the interposition of the electronic switches 142 and 144 between the receivers and the video amplifier 146. The connections and the circuits of these switches will be described more fully later in connection with the description of Fig. 6. Suffice it to say at this instant that the switches alternately block the outputs of the receivers so that proper echoes are reproduced on the proper sweep traces of the PPI oscilloscope. The effect of the electronic switches on the received signals is illustrated at 5—26 through 5—30 in Fig. 5. The electronic switches derive their keying pulses 5—9 and 5—15 from multivibrator circuits 168 and 172 to which they are connected over conductors 150 and 152.

The output of modulator 100 is also connected over a conductor 153 to a range marker channel 154 which consists of an isolating amplifier 156, a range marker 158, and an isolating and inverting amplifier 160. The range marker 158 comprises a short duty-cycle, freely oscillating, multivibrator the parameters of which are adjusted to produce properly spaced range marker signals 5—24, which are combined in a video channel 150 with the output of the No. 1 and No. 2 receivers, producing a composite signal 5—31, Fig. 5. This is impressed on the cathode 161 of the cathode ray tube 130 producing intensity modulation of the cathode ray beam. The final results of such intensity modulation of the beam, as they appear on the screen of the cathode ray tube 130, are illustrated in Fig. 3, with the echoes appearing at 306 through 310, and the markers at 312. Sweep trace 300 to 302 is adapted to reproduce the echoes from No. 1 receiver, while the sweep trace 300 to 304 may be modulated to reproduce the echoes from No. 2 receiver. The entire range marker channel may be omitted altogether if it is preferable to use a properly engraved, transparent scale superimposed over the oscilloscope screen. Since the full ranges of the two exploratory channels, in this case, are unequal, it is preferable to use a range marker channel because the two different range scales, superimposed over the same screen, would tend to be confusing.

Figure 5:
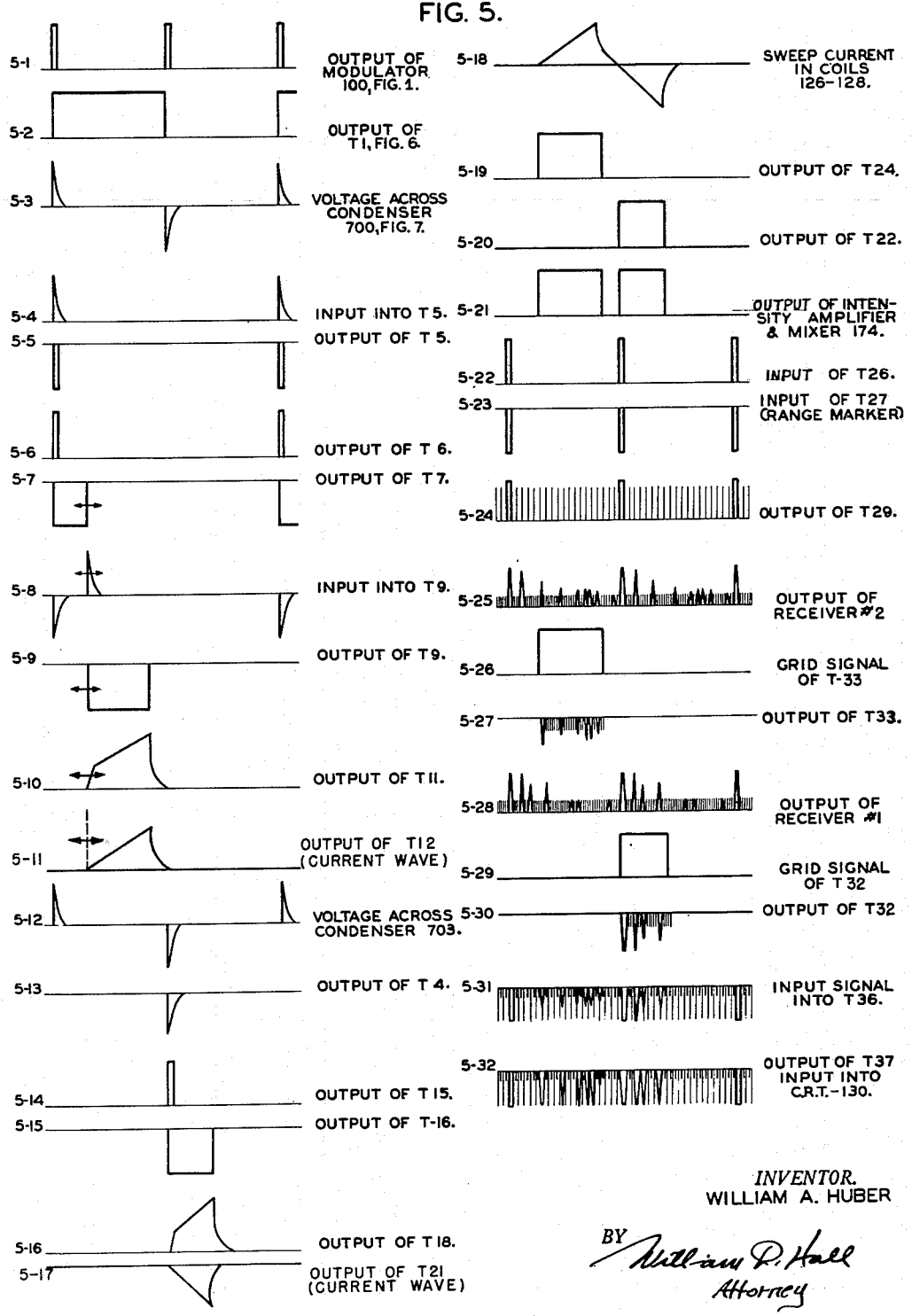
Figure 5 illustrates the oscillograms of the waves normally appearing in the circuits shown in Figs. 6 and 7.

Modulator 100 is also connected over a conductor 161 to a pulse frequency divider 162, preferably consisting of an Eccles Jordan multivibrator circuit which generates a series of rectangular waves 5—2, Fig. 5, and, in effect, aids, in connection with the additional circuits connected to it, to direct one modulator pulse to one sweep voltage channel, and another succeeding modulator pulse to the other sweep voltage channel. To accomplish this result, the pulses forming the rectangular wave 5—2 appearing in the output of the divider 162 are impressed in parallel on two differentiating networks, separators and shapers 164, 166 where they are transformed into two series of rectangular pulses 5—6 and 5—14, the first series of pulses being derived from the even numbered modulator pulses, and the second series from the odd numbered modulator pulses. These pulses are also illustrated in Fig. 5 and bear the same numerals in that figure. Pulse 5—14 is used for controlling a delayed multivibrator 168 as well as a saw-tooth oscillator, an amplifier and a clamper connected to it. Pulse 5—6 controls a precision delayed multivibrator 170 and a differentiating network connected in the output of the latter, the output of the network controlling the circuits included in a block 172 which, except for some difference due to circuit constants, is identical to that of the circuits included in the block 168. Two saw-tooth current waves 5—11 and 5—17 appearing in the output of the amplifiers, which represent the output stages of the two sweep voltage channels, are impressed on the rotating electromagnetic deflection coils 126 and 128 where they produce the radial deflection of the cathode-ray beam alternately in the diametrically opposite directions from an approximate geometric center of the cathode ray tube screen.

It has been previously mentioned that the deflection coils 126 and 128 are rotated in synchronism with the antenna arrays 106 and 108; although the antennas as well as the deflection coils are rotated at uniform angular velocity, and advance continuously at a uniform rate, this angular velocity is so low as compared to the outward radial travel velocity of the cathode ray beam, and the angle through which the coils advance during each sweep is so infinitesimal, that the No. 1 and No. 2 sweep traces appear as a substantially straight line on the oscilloscope screen as illustrated in Fig. 3 where the two traces form a straight line 302—300—304, bisecting the oscilloscope screen.

In order to block the cathode ray beam on its return trips and between deflections, the blockage in the latter case being necessary when the keying frequency is so low that there are idle periods between deflections, a positive bias is applied to cathode 161 through a potentiometer arm 165 connected to a bleeder resistor 163. To overcome this bias during the linear portions of the sweep deflections, the outputs of the multivibrators 168 and 172 are connected to an intensity amplifier and mixer 174; its output is connected to an intensity grid 176 through a potentiometer 178. Since the positive rectangular waves 5—21 are impressed on the intensity grid 176 at the very same time that the linear portions of the saw-tooth waves 5—11 and 5—17 are impressed on the electromagnetic deflection coils 126 and 128, only the echoes which coincide in time with the linear portions of the saw-tooth waves can appear on the oscilloscope screen.

Summarizing briefly the operation of the radio locator disclosed in Fig. 1, the antenna arrays 106 and 108 and the deflection coils 126 and 128 are rotated at the same angular velocity. Two transmitters are keyed simultaneously by one modulator and two exploratory pulses are transmitted at the very same time by the antennas in the diametrically opposite directions. The relationship of the rotational speeds of the antennas and of the deflection coils, and the rate of keying of the transmitters is such that the bi-radial sweep traces form a substantially straight line on the oscilloscope screen. The received signals are impressed on two receivers, and electronic switches key the outputs of the receivers so that only the output of one receiver is impressed on the oscilloscope circuit at any given time. The electronic switches are operated in synchronism with the sweep channels so that either one or the other receiver impresses its signals on the oscilloscope circuit during the linear portions of the saw-tooth waves. Accordingly, the signals from No. 1 receiver are reproduced along one radial sweep trace and the signals from the other receiver are reproduced along the opposite trace, the two traces constantly pointing in the directions of the respective lobe axes so that true azimuth location of the objects is reproduced on the oscilloscope screen. No alternate keying of the transmitters is used in this system since it is presumed that the auxiliary oscilloscopes, which are often used with systems of this type, are connected to the No. 1 and No. 2 receivers thus requiring continuous operation of the two transmitting-receiving channels. Another arrangement, permitting alternate keying of the transmitters is illustrated in the joint application of W. A. Huber and N. T. Volsk, Serial Number 571,642 filed January 6, 1945.

Figure 6:
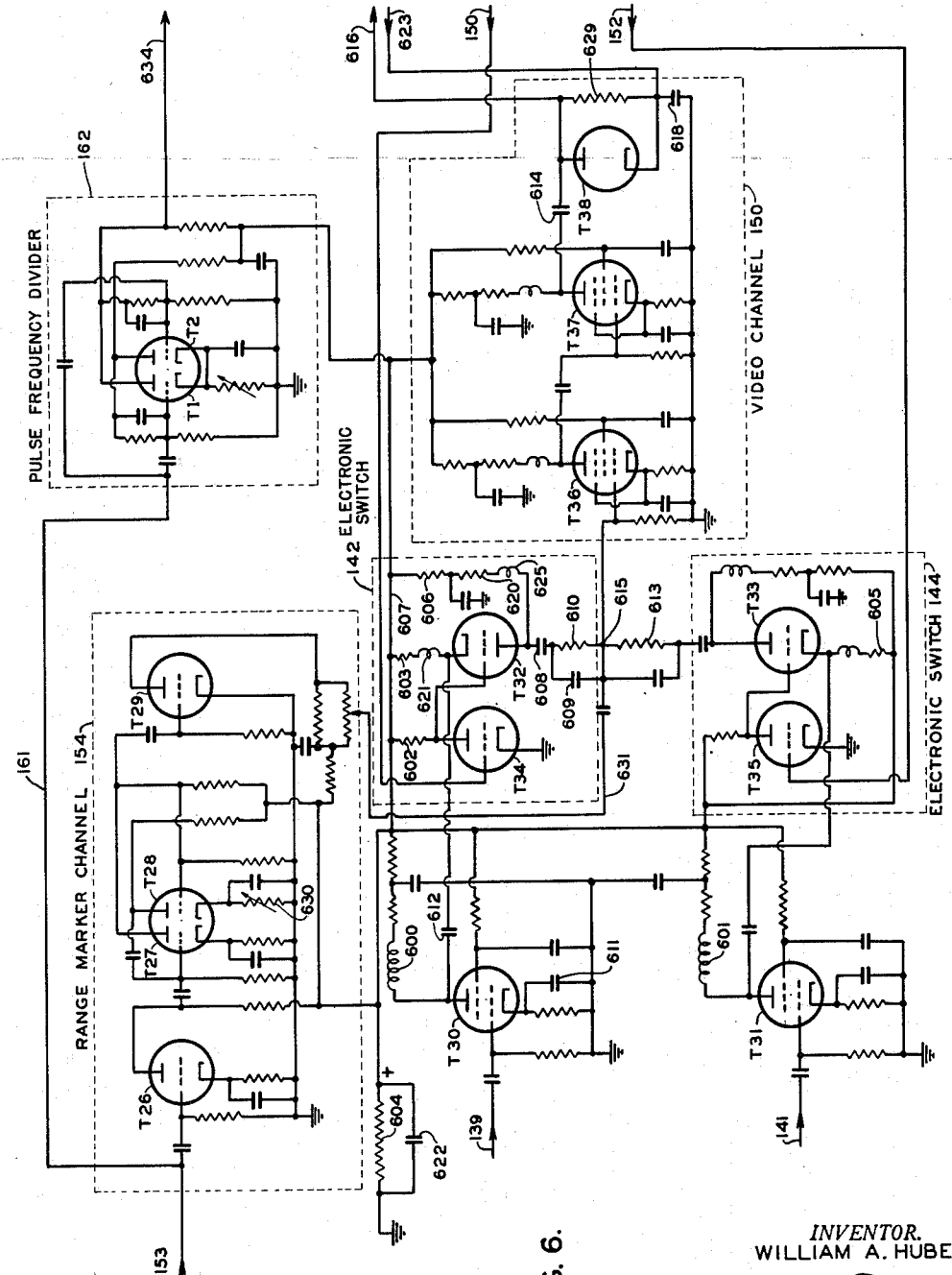

Reference is now made to Figs. 6 and 7, the relationship of which with respect to each other is illustrated in Fig. 4, Fig. 7 being a continuation of the circuits shown in Fig. 6. Figs. 6 and 7 are the schematic diagrams of the bi-radial oscilloscope sweep circuit and of the video channels, including the electronic switches for alternately keying the video channels, the transmitter-receiver combinations not appearing in these figures since it per se does not form a part of this invention. The disposition of the various elements in these figures, which correspond to the same elements also shown in a block form in Fig. 1, is as follows: the range marker channel 154 appears in the upper left corner of Fig. 6, the pulse frequency dividing multivibrator 162 is in the upper right corner of Fig. 6, and the video circuits, including two electronic switches, are shown in the remaining lower portion of Fig. 6; in Fig. 7 No. 1 sweep channel appears at the top, No. 2 sweep channel at the bottom, and the intensity amplifier and mixer 174 is in the central portion of Fig. 7 and between the No. 1 and No. 2 sweep channels. The oscilloscope tube 130 is in the upper right corner of Fig. 7.

Proceeding first with the description of the circuits of the No. 1 and No. 2 sweep channels, these channels begin with a conductor 161 (top of Fig. 6) which impresses the positive voltage signals 5—1, generated by modulator 100, on the control grids of triodes T-1 and T-2, which comprise an Eccles Jordan multivibrator circuit. This type of multivibrator circuit is well known in the art, and needs no detailed description. As mentioned previously in connection with Fig. 1, it has two degrees of stability, one tube being fully conductive while the other is nonconductive, and vice versa, the conductivity of the tubes being controlled either by positive or negative voltage pulses impressed in parallel on the control grids of the two tubes. Once put into one state of stability, the circuit remains in this position indefinitely until it is put into the other state of stability by the succeeding control pulse 5—1. The voltage signal appearing in the plate of tube T-1 is a rectangular wave 5—2, the duration of which is equal to the duration of one keying cycle. The rectangular wave 5—2 is impressed in parallel over conductors 634 and 707 on two differentiating networks consisting of condenser-resistance combinations 700—704, and 703—705. Here it is transformed into a series of positive and negative pulses 5—3 and 5—12 respectively, which are impressed on the plate and cathode of diodes T-3 and T-4 respectively. Diode T-3 is rendered conductive by the positive pulses, and diode T-4 is rendered conductive by the negative pulses. The voltage signal impressed on the control grid of a triode T-5 is illustrated at 5—4. Since the control grid of T-5 is coupled to a cathode resistor 701 of diode T-3, the signals impressed on this grid have positive polarity, the negative signals having been by-passed to ground by resistance 704 without producing any voltage signal in the cathode resistor 701. Diode T-3 represents the beginning of No. 2 sweep channel, and the circuits of this channel will be described first; it will then be followed by the description of No. 1 sweep channel. Triodes T-5 and T-6 are two shaping amplifiers which transform signal 5—4 impressed on the control grid of T-5 into a rectangular pulse 5—6. Triode T-5 is overdriven by signal 5—4 so that an approximately rectangular pulse 5—5 appears in its output. Triode T-6 is normally conductive and is overdriven in a negative direction by the negative pulse 5—5 so that its output represents a substantially rectangular pulse 5—6. This is impressed on a potentiometer 704 which is connected to the control grid of a triode T-7 through a coupling condenser 706.

Triodes T-7 and T-8 represent a precision delayed multi-vibrator circuit which is used for generating a rectangular wave 5—7 of adjustable width. This multivibrator comprises a twin triode biased multivibrator, the width of the output pulse of which is a linear function of the grid bias impressed on the grid of the first triode T-7 by a biasing battery 709 and a potentiometer 708 through a grid resistor 710. Potentiometer 708 comprises a source of variable biasing potential which is used for controlling the width of the rectangular wave 5—7 appearing in the output circuit of triode T-7. The common cathode of the triodes is connected to ground over a cathode resistor 712 and the plates are connected to a positive source of potential 714 over resistances 716 and 718. The grid of triode T-8 is coupled to the plate of triode T-7 over a condenser 720, and to the positive source of potential 714 over a resistance 722. Condenser 721 is a by-pass to ground condenser.

The operation of this multivibrator circuit is as follows normally, the second triode T-8 is conductive since its grid is held at approximately the cathode potential by the grid current through the large grid resistance 722. The voltage drop through the common cathode resistance 712 is sufficient to make the cathode positive with respect to the grid of the first triode T-7 which is, therefore, nonconductive. Condenser 720 is charged to a voltage equal to a potential difference between the plate of T-7 and the grid of T-8 because of the small grid current drawn by T-8. A positive trigger voltage 5—6 is applied through a small coupling condenser 706 to the grid of T-7. The time constant of the grid circuit of T-7 is made very small (in the order of one quarter of one microsecond), so that only high frequency components of the trigger signal passes into the grid circuit. A diode may be used between T-6 and T-7 to insure that the voltage applied to the grid is positive. A positive trigger of about 0.2 microsecond results and T-7 thereby becomes conductive. The plate voltage of T-7 drops, and through condenser 720 the grid of T-8 is driven below the new cathode potential. The cathode potential falls immediately after the trigger pulse to a value which is determined by the grid bias impressed on the grid of T-7 by potentiometer 708. In this condition T-7 is conducting and T-8 is nonconducting.

As the grid of T-8 is no longer conducting, condenser 720 discharges through the resistances 722 and 716, and the grid potential of T-8 rises to the point at which T-8 begins to conduct. At this point T-7 is cut off and the multivibrator returns to the quiescent condition. The change occurs very rapidly and in a regenerating fashion. With the beginning of the current in T-8 the cathode potential rises to cut off T-7, which in turn raises the grid potential of T-8 through condenser 720 increasing the current in T-8.

The pulse width can be altered by changing the values of the resistance 722, condenser 720, resistance 712, or the grid potential impressed on the grid of T-7 by potentiometer resistance 708. The variation of the grid potential is actually the most convenient method of controlling the pulse width. Its principal effect occurs in changing the cathode potential when T-7 is conducting and thereby changing the amount condenser 720 must discharge before T-8 begins to conduct. It also varies the plate voltage of T-7 when the latter is conducting. It may be shown experimentally as well as theoretically that this, together with the curvature of the grid-plate characteristic of T-7, results in a high degree of compensation of the inherently non-linear relationship between the voltage and discharge time of condenser 720. Because of the highly accurate linear relationship between the pulse width and the grid voltage, the multivibrator T-7—T-8 is here referred to as a precision delayed multivibrator. The highly accurate linear relationship between the pulse width or the duration of the duty cycle of this multivibrator and the grid voltage is utilized for changing the time of occurrence of the saw-tooth wave generated by the No. 2 sweep channel and for determining the range up to that point at which the early warning range begins. Therefore, the range reading in this case consists of the range reading as it appears on the calibrated scale of potentiometer 708, plus the reading of the early warning sweep. Moreover, the calibrated potentiometer 708 is used for quickly selecting the desired starting point of the early warning range for its reproduction on the vernier range. Potentiometer 708 may also be used for determining at once the entire range of any desired echo (within certain limits which will be discussed later in connection with the operation of the system) by positioning its image on the oscilloscope screen in line with a reference circle 320, Fig. 3 engraved on a scale dial superimposed upon the oscilloscope screen.

The rectangular wave 5–7 is impressed on a differentiating network 724—726, which transforms it into a series of positive and negative pulses 5—8. These are impressed on the control grid of the first tube of a second delayed multivibrator circuit consisting of triodes T-9 and T-10; the connections and the functioning of which are identical to those of the precision delayed multivibrator T-7—T-8 with two exceptions: the biasing potential impressed on the control grid of T-9 remains fixed while the time constant of a resistance-condenser combination 728—730 is made adjustable so that in this multivibrator it is the parameter of the second control grid that is made variable for varying the width of the rectangular wave 5—9 appearing in its output. It is the duration of this rectangular wave that determines the duration of the linear portion of the No. 2 sweep. Therefore, multivibrator T-9—T-10 circuit is adjusted so that the duration of the rectangular wave 5—9 corresponds to the desired range span of the early warning sweep. Normally once this adjustment has been made it remains fixed.

The rectangular wave 5—9 is impressed on the control grid of a triode T-11 which comprises a "single-ended" saw-tooth oscillator of the No. 2 sweep channel. The control grid of T-11 is connected to the bleeder resistor 714 which impresses positive potential on this grid through a grid resistor 732; therefore, T-11 is normally fully conductive so that a sweep generating condenser 734 is normally kept in a substantially discharged condition. This condenser is connected across the output of T-11 in series with a parallel resistance-capacity network 738—739. The plate of T-11 is connected to a positive source of potential 714 over a plate resistor 736 and an isolating resistor 742, the latter being shunted to ground by a filtering condenser 744. When the negative rectangular wave 5—9 is impressed on the control grid of T-11, it renders this grid negative and T-11 nonconductive. The voltage across condenser 734, which was quite low because of the high IR drop in the plate resistors 736 and 742 as long as T-11 remained fully conductive, now instantaneously jumps up to an intermediate positive potential due to the instantaneous IR drop appearing across resistor 739. After reaching this initial instantaneous potential, condenser 734 begins to charge resulting in a linear portion of the sweep wave 5—10. This initial abrupt start of the voltage sweep wave 5—10 is necessary because it is later impressed on the rotating yoke coils 126—128 which have considerable inductance, and it is only the voltage of this form that can produce a linear current wave 5—11 in these coils and a linear change in the beam deflecting flux in the oscilloscope tube. Variable condenser 738 is provided for adjusting the initial instantaneous voltage wave front of the voltage wave 5—10; the smaller this condenser is, the more instantaneous is the initial rise of the voltage wave. Resistor 736 may be a variable resistor so that proper initial voltage rise may be obtained at condenser 739. Thus, in order to produce eventually the linear sweep by means of the rotating coils 126—128, the voltage wave 5—10 may need some adjustment by means of condenser 738 and resistance 739 until the desired linear current saw-tooth wave 5—11 is obtained. While condenser 738, when varied, may make the sudden voltage rise either more or less abrupt, variation of resistance 739 will make the amplitude of this rise either higher or lower. The voltage wave 5—10 is applied to the grid of a beam power tube T-12 which, after linear amplification of this wave, impresses it on the rotating coils 126—128 over a conductor 748. The cathode-plate circuit of this tube is as follows: cathode 749, conductor 748, coils 126—128, ground 750, a grounded source of potential 714, and a plate 751. The A. C. grid circuit of this tube is through a condenser 752, resistance 736, condenser 744, grounded bus 755, ground 750, coils 126—128, conductor 748 and cathode 749.

In order to stabilize the central position of the beam on the cathode-ray oscilloscope, the control grid of T-12 is also connected to a "clamper" circuit consisting of tubes T-13 and T-14 which act, when conductive, as two variable uni-directional resistances connecting control grid 754 to a grounded tap 758 through a bleeder resistor 756. These tubes "clamp," or hold, the grid potential of the power amplifier tube T-12 at a steady, fixed potential which renders T-12 nonconductive when no saw-tooth wave is impressed upon it. It is essential than T-12 always returns to and retains exactly the same, constant cut-off potential between the saw-tooth waves for two reasons: first this tube should remain continuously nonconductive during its inactive period so that it does not interfere with the saw-tooth wave 5—17 impressed on the coils by the second power amplifier T-21 of the No. 1 sweep channel; and, second, T-12 must always return to exactly the same cut-off point on its transconductance curve so that when the next saw-tooth wave is impressed upon it, it will start amplifying this wave from that fixed cut-off point thus impressing on the deflection coils current saw-tooth waves of the continuously equal amplitudes. That this must be the case is not difficult to understand, since it has been previously stated that the accuracy of all range determinations depends upon the fact that the sweep always starts from the zero range center on its outward radial journey, and that the range is determined by measuring radial distance from this zero range center. Any lack of stability in the circuits of T-12 would immediately result in a "wandering zero range point" and inaccurate range determinations.

Proceeding now with the description of connections of the clamper circuit, the clamper tubes T-13 and T-14 are connected to a separate source of potential shown as a bleeder resistor 756, an intermediate point 758 of which is connected to ground. The resistor is by-passed to ground by condensers 763 and 765. The plate of T-13 is connected to the positive end of resistor 756, while the cathode of T-14 makes a potentiometer type connection with the same resistor through a potentiometer arm 761 connected to a point which is below the ground potential. The potentiometer arm 761 and the ground tap 758 are so positioned on resistor 756 that sufficiently negative potential is impressed on the control grid of the power amplifier tube T-12 so as to normally render T-12 nonconductive. The fact that the positions of the potentiometer arm 761 and of tap 758 determine the biasing potential normally impressed on the control grid of T-12 will become more apparent from the description of the functioning cycle of the clamper circuit. The control grids of T-13 and T-14 are connected in parallel to a coupling condenser 760 and to a grid resistor 757, the other end of which is connected to the positive end of resistor 756. Normally T-13 and T-14 are both conductive because of the full plate potential initially appearing on their control grids. When this is the case, T-14 becomes conductive and current flows from its cathode to its control grid and the plate. This current at once enables T-13 to become conductive so that the two tubes conduct a series current from the cathode of T-14 to the plate of tube T-13. The grid current carried by the control grid of T-14 produces an IR drop in the grid resistor 757 so that this grid assumes a potential which is only slightly above the ground potential. At this instant T-14 carries two currents: one current is from the cathode to its control grid, this current taking place because, even though the control grid is not very far removed from the ground potential, the cathode of T-14 is below the ground potential thus making this current possible; the second current is from the cathode to its plate, and it is this current that mainly determines the potential between ground and the control grid of T-12 at this instant. By adjusting the positions of the potentiometer arm 761 and ground tap 758 on the bleeder resistor 756, the conductivity of T-14 may be controlled thus controlling the potential appearing on the control grid of T-12. Referring again to the current flowing in series through the two tubes from the cathode of T-14 to the plate of T-13, it is apparent that the potential impressed on this series circuit by resistor 756 will divide itself across the cathode-to-plate impedances of the two tubes. Because of different grid-to-cathode voltages, these impedances will not be equal, and, therefore, the potential drop across T-14 will be lower than the potential drop across T-13. These grids are always at the same potential to ground, while the cathode of T-14 is always at a much lower potential to ground than the cathode of T-13; therefore, T-14 will be always more conductive than T-13, the excess current carried by T-14 being diverted to the control grid of T-14. The entire circuit is so adjusted by adjusting the potentiometer arm 761 and ground tap 758 that the voltage drop across T-14 is considerably lower than the same voltage drop across T-13, and the grid of T-12 is at its cut-off potential when T-13 and T-14 are in their normal conductive state.

If, at this instant, any interference signals appear across the coupling condenser 752, they are immediately discharged either across T-13 or T-14 so that the control grid of T-12 retains its constant potential with respect to ground. When the signals impressed by the coupling condenser 752 are of negative polarity, they decrease the conductivity of T-14 and increase the conductivity of T-13 in proportion to the disturbance created by the condenser and this change in the conductivities of the clamper tubes immediately restores the potential of the control gril of T-12 to its normal value. The same is true when the interference potentials are of positive sign, except that in this case T-14 becomes more conductive and T-13 less conductive. The control grids of T-13 and T-14 are connected to the output of T-9, the first tube of the multivibrator, over a coupling condenser 760 which periodically impresses upon these grids the negative rectangular wave 5—9 rendering these grids negative with respect to the cathodes. The alternating current circuit of condenser 760 is: resistor 757, grounded condenser 765, grounded bus 755, condenser 729, plate resistor 731, and condenser 760. When the negative rectangular wave is impressed across the grid resistor 757, and T-13 and T-14 become nonconductive, they are transformed into high impedance devices, and, therefore, T-12 can now amplify the sweep wave impressed upon its control grid at this instant by the sweep generator T-11.

Referring now to No. 1 sweep channel, it begins with a differentiating network 703—705 connected to a diode T-4. This diode is rendered conductive by the negative signals so that its plate output appears as a negative signal 5—13. This signal overdrives a normally conductive shaping triode T-15 in the negative direction resulting in a rectangular pulse 5—14. It is impressed on a delayed multivibrator consisting of triodes T-16, T-17 which correspond to the same type of multivibrator T-9, T-10 in the No. 2 sweep channel. A rectangular wave 5—15 appearing in the plate circuit of triode T-16 is impressed on the control grid of a saw-tooth generator T-18 and "clamper" tubes T-19 and T-20. The clamper tubes are connected to the control grid of a power amplifier T-21 which is connected to the coils 126, 128. The functioning as well as the connections of these elements is identical to those in the No. 2 channel, and therefore needs no additional description.

Comparing the connections and the elements in the No. 1 and No. 2 sweep channels, one may readily see that there is no precision delayed multivibrator in the No. 1 sweep channel while there is one in the No. 2 channel. Accordingly, the No. 1 sweep channel, and especially its multivibrator T-16—T-17, is so adjusted that the generated sweep trace corresponds to the maximum range of the upper lobe 12, Fig. 2, and its duration as well as its position with respect to the transmitted signal remain fixed. Accordingly, all signals received by means of this lobe are reproduced on this sweep. In the No. 2 sweep channel, the duration of the saw-tooth wave 5-11 also remains fixed, and its time of occurrence with respect to the transmitted signals is adjusted so as to reproduce the outlying portion of the range, which is beyond the range of lobe 12. Accordingly, only the early warning portion of lobe 10 appears on the No. 2 sweep.

To avoid any range gap between the two sweeps, the precision delay multivibrator T-7—T-8 is adjusted so as to make the initial portion of the saw-tooth wave 5—11 include the extreme range portion of the saw-tooth wave 5—17. The keying rate of the transmitters must be adjusted so as to allow the saw-tooth wave 5—11 to reach its zero amplitude point before there is an appearance of the saw-tooth wave 5—17. This is illustrated at 5—18 in Fig. 5.

Proceeding now with the description of the range marker channel 154, the schematic of which is shown in the upper left corner of Fig. 6, the keying pulse from the line pulse modulator 100 is impressed over conductor 153 on an isolating amplifier T-26 which is so biased that it linearly amplifies the rectangular pulses 5—1 impressed upon it by the modulator. Triodes T-27 and T-28 comprise a short duty cycle, self-oscillating multivibrator, the frequency of which is adjusted by means of a variable cathode resistor 630 so that it generates a series of uniformly spaced rectangular pulses 5—24. Pulses 5—23 are impressed on the control grid of triode T-27, thus time-phase synchronizing the oscillations of the multivibrator with the starting periods of the saw-tooth wave 5—17, and the appearance of the exploratory pulses 5—1 of the cathode 161 of the cathode ray tube 130. This synchronization of the multivibrator circuit insures accurate location of the zero markers and all other range markers on the oscilloscope screen. The time interval between the duty cycles of this multivibrator is so chosen that it represents some convenient range distance on the screen of the range oscilloscope. For example, if the full range of the system is 300 miles, the time interval between the duty cycles may be adjusted to produce 10 or 20 mile range markers 312, Fig. 3, on the oscilloscope screen. The output of the multivibrator is impressed through an isolating and inverting amplifier T-29 and a conductor 631 on the control grid of a mixer tube T-36 in the video amplifier and mixer channel 150.

The video channel begins in Fig. 6 with two conductors, 139 and 141, which connect the output circuits of the No. 1 and No. 2 receivers to to two tetrodes T-30 and T-31. These negatively biased tetrodes act as linear amplifiers of the positive video signals impressed upon them by the receivers. Choke coils 600 and 601 are inserted in the plate circuits of tubes T-30, T-31, T-32, T-33, T-36, T-37 and the cathodes of T-32 and T-33 to effect high frequency compensation. Triodes T-32 and T-33 act as non-additive electronic switches in the two parallel video channels. The grids of the triodes T-32 and T-33 are directly connected to the plates of triodes T-34 and T-35 respectively. The grids of the normally conductive triodes T-34 and T-35 are connected over conductors 150 and 152 to the outputs of the multivibrator tubes T-16 and T-9 shown in Fig. 7, which impress on the grids of T-34 and T-35 negative rectangular voltage waves 5—15 and 5—9 respectively. Thus T-34 and T-35 are rendered alternately nonconductive for the periods of time which are equal to the duration of the duty cycles of the No. 1 and No. 2 sweep channels. The circuit of the control grid of T-34 is as follows: conductor 150, grid resistor 790, and a grounded bleeder resistor 791. With no rectangular wave 5—15 impressed on the grid of T-34, because of the positive potential impressed upon it by the bleeder resistor 791, T-34 is fully conductive. Since the grid of T-32 is directly connected to the plate of T-34, it is approximately at ground potential when T-34 is conductive because of the IR drop in the plate resistor 602, and is considerably below the full positive potential impressed on the cathode of T-32 over a resistor 603, inductance 621, conductor 607, and bleeder resistor 604. This renders T-32 nonconductive even when there are signals impressed on the cathode of T-32 by the video amplifier T-30 through the coupling condenser 612, inductance 621, and resistance 603. When the negative rectangular wave 5—15 renders the grid of T-34 negative, T-34 is rendered nonconductive, and the grid of T-32 assumes a potential equal to the potential of the cathode, full positive potential being now impressed upon both of them by the bleeder resistor 604. If at this time any negative signals are impressed on the cathode of T-32 by T-30 over condenser 612, T-32 is made to act as a diode and is thus rendered conductive, as illustrated at 5—27 in Fig. 5. The connection between the plate and the cathode of T-32 is over inductance 625, resistors 620 and 606, the cathode resistor 603 and inductance 621. The video frequency circuit of condenser 612 is as follows: the plate of T-30, condenser 612, cathode inductance 621, resistor 603, grounded condensers 622 and 611, and the cathode of T-30. The output of T-32 is connected through a condenser 608 and a resistance-condenser combination 609, 610 to the control grid of a mixer tube T-36 which is normally fully conductive. Resistances 610 and 613 are used for isolating as much as possible the triodes T-32, T-33 and T-29 from each other so that any variation in the potential of the junction point 615 would not have any feed-back action on the triodes T-32 and T-33.

The advantage of the electronic switch resides in the fact that the keying signals impressed on the grid of T-32 do not disturb the normally nonconductive state of T-32 since the cathode and the plate of T–32 are connected to the same source of positive potential 604, and only the negative signals impressed on its cathode, while the grid potential is made positive, can make this tube conductive. As a consequence, only the desired signals, impressed on the cathode of T–32 by T–30 through the coupling condenser 612, can appear in the output of T–32. It is impossible to obtain such results when a multigrid mixer tube or a pentode is used as an electronic switch with one grid connected to the signals and the other grid to the keying pulses since in such a case altering of potential on one grid by means of the keying pulses immediately alters the conductivity of the tube with the result that the keying pulses themselves, as well as the desired signals, appear in the output of the tube. Moreover, there is a modulation of the keying pulses by the desired signals, higher percentage of the keying pulses appearing in the output when the amplitude of the desired signals is high, and vice versa.

The video circuits between the output of receiver No. 2 and the mixer stage T–36, which include a negatively biased amplifier tube T–31, a keying triode T–35 and a triode T–33 blocking the signals from the receiver No. 2, correspond to the same respective elements T–30, T–34 and T–32 in the No. 1 receiving channel. The action of these tubes is, therefore, identical to the action of the respective elements in the No. 1 channel, i. e. they impress the video signals on the control grid of the mixer stage T–36 during the duty cycle of the No. 2 receiver, as shown at 5—28 through 5—30 in Fig. 5.

The functioning of the electronic switching circuit may be briefly summarized then as follows: because of the difference in the antennae lobe patterns and the difference in the echoes received by the two antennae, it is necessary to separate the outputs of the two receivers in the oscilloscope, and reproduce all echo signals received by the No. 1 receiver on the No. 1 sweep and exclude all signals that may be received at this time by the No. 2 receiver. This is accomplished by blocking T–33 during the duty cycle of the No. 1 receiver. Conversely, when the output of the No. 2 receiver must be impressed on the cathode of the cathode-ray tube, the output of the No. 1 receiver must be blocked, and this is accomplished by blocking T–32 during the duty cycle of the No. 2 receiver.

A normally fully conductive pentode T–36 thus receives the video signals first from one receiver and then from the other, and it also continuously receives the marker signals from the range marker channel. The polarity of all these signals is negative, as shown at 5—31 in Fig. 5, and, therefore, T–36 impresses positive signals on the control grid of a normally nonconductive amplifier pentode T–37. Here the video and marker signals are amplified and are impressed on a coupling condenser 614 and a conductor 616 as negative pulses 5—32 thus depressing the potential of cathode 161, Fig. 7, of the cathode-ray tube 130. A D. C. diode restorer T–38 is connected between conductor 616 and ground through a coupling condenser 618. If any positive signals appear on the conductor 616 because of the capacitive nature of the circuits used for coupling the output stage of the video amplifier T–37 to cathode 161, they are shorted to ground by the D. C. restorer T–38 thus stabilizing the normal positive biasing potential impressed on cathode 161 by the bleeder resistor 163 over conductor 623 and resistance 629.

The video and the marker signals 5—32 produce a series of bright marker dots 312 or bright echo arcs 306—310 on the screen of the oscilloscope as illustrated in Fig. 3.

It has been previously mentioned in this specification that the rotational speed of the antenna arrays 106, 108 is, as a rule, quite low because of their weight, rotational speeds in the order of one or two R. P. M. being the customary speeds ordinarily encountered in actual practice. However, higher rotational speeds may be used occasionally when an unusually high rate of scanning of the surrounding space is imperative, and, when this is the case, the rotational speeds may rise to as high a value as 20 R. P. M. When the antenna rotational speeds are in the order of one to two R. P. M. and the keying rate of the transmitters 102 and 104 is in the order of 300 cycles per second, very satisfactory signal reproductions are obtained on the oscilloscope screen without any overlapping of the two sectors when the retentivity of the screen is in the order of P–7 screen, RMA code. However, as the rotational speed of the antennas is increased above two R. P. M. with the keying rate remaining constant, because of the relatively high retentivity of the P–7 screen, considerable glow may be retained on the screen at the trailing ends of the sectors up to the time of appearance of the following sectors, resulting in a simultaneous reproduction of signals by the two channels over the same screen sectors. This would obviously result in the confusion of the images on the oscilloscope screen. To avoid this confusion a three-position switch 782 is provided, the rotating arm of which is connected to a grounded bus 784, terminals No. 2 and No. 3 of which are connected to the outputs of the shaping amplifiers T–6 and T–15 respectively. The shaping amplifier T–6 is connected to the No. 2 terminal by means of a conductor 780. When switch 782 makes contact with terminal No. 1, No. 1 as well as No. 2 sweep channels are operated in the usual manner, since this is the open position of the switch. When the switch is turned to terminal No. 2, the output of the shaping amplifier T–6 is connected to ground which eliminates the No. 2 sweep channel; when the switch is turned to terminal No. 3, the No. 1 sweep channel becomes grounded. Thus, by setting this switch to the previously mentioned positions, either of the two channels may be completely eliminated, thereby avoiding the above mentioned overlapping of the images. This is accomplished, however, at the expense of eliminating one of the transmitting-receiving channels which may not necessarily be objectionable in connection with the desired purpose.

Summarizing the operation of the radio locator illustrated in the Figs. 1, 6, and 7, it utilizes back-to-back antenna arrays for minimizing the null effects of the antenna radiation patterns. For more economical utilization of power, two transmitters using different frequencies are used, these transmitters being keyed simultaneously by a single modulator. The outputs of the transmitters are impressed simultaneously on the two antennas which transmit the exploratory pulses in diametrically opposite directions, the antenna arrays 106 transmitting the early warning exploratory pulses of lower frequency than the exploratory pulses transmitted by the antenna 108.

The latter scans the space in the vicinity of the radio locator up to a height of 40 or 50 thousand feet. The antennas act as the transmitting-receiving antennas, their outputs being impressed on the two receivers 138 and 140 respectively through the two duplexing circuits 134 and 136 when they act as receiving antennas. In order to avoid confusion of the images of different echoes on the screen of a single oscilloscope, and to prevent the reduction in the signal-to-noise ratio if the outputs of the two receivers were impressed simultaneously on a single video channel, the electronic switches 142, 144 are inserted between the two receivers and the oscilloscope circuit, these switches blocking the output of one receiver and then the other in alternate succession. The synchronous operation of the electronic switches with the transmitter-receiver channels is obtained by controlling the sweep generating circuit of the oscilloscope by the pulses generated by the modulator 100 and by using the rectangular waves generated in the sweep generator channels for rendering the electronic switches alternately conductive. Thus, only the output of one receiver is impressed on the linear amplifier 146 at any given time, and because the two saw-tooth waves impressed on the rotating deflection coils of the oscilloscope are of opposite polarity, the cathode ray beam is first deflected along one radius and then along the diametrically opposite radius as illustrated in Fig. 3. Proper synchronization of the sweep and the video channels results in the reproduction of all signals received by antenna 106 along one radial sweep trace, and all signals received by antenna 108 along thhe diametrically opposite sweep trace. Range markers are used for determining the range of the objects producing the echo signals, and the durations of the sweeps are adjusted so that the first marker occurs at the beginning of the sweeps. Circuits are also provided for reproducing the signals from only one receiver when the rotational speeds of the antennae are too high for the biradial sweep.

The advantages of the disclosed system should be apparent to those skilled in the art from the given disclosure. A PPI system possessing greater operating versatility has been disclosed. The early warning echoes as well as the short range echoes are reproduced on the screen of a single oscilloscope tube, thus enabling one operator to observe the entire field scanned by the two antennas on one screen.

The invention has been illustrated and described in connection with a radio locator which uses two different transmitting frequencies for the reasons which have been fully outlined in the specification. It is obvious that the disclosed system will function equally well when the transmitters have the same frequency since none of the circuits which are claimed to be new depend on the transmitting frequency per se. The by-radial sweep is obviously adapted and is so timed as to reproduce the desired portions of the scanning lobes, but the timing circuits do not depend on the frequency of the transmitters. The use of two identical frequencies may prove advantageous when greater scanning rate of space is desirable than the scanning rate which can be achieved with the antennas possessing large mass and mounted on exceptionally high towers.

In describing the radio locator references were made throughout the specification to "echoes" and "echo signals," which ordinarily have a meaning in the art of radio locators a reradiated energy, or that energy which is reradiated by the objects capable of reflecting or reradiating the radio waves when these objects find themselves in the path of the transmitted radio waves. There are now in use additional types of radio locating systems in which the objects are equipped with the transmitters which send signals in response to the reception of radio energy, the systems of the latter type being known as Identification Friend or Foe Systems, or IFF systems. The radio locator disclosed in this specification may function equally well with either type of "echo" signals, and, as a consequence, the term "echo" as used herein is not to be restricted to signals which are reflected or passively reradiated by a body. This term is also used to signify any automatic response to a signal, e. g. that obtained by means of a normally inoperative transmitter, located on said body, and which, when keyed by a pulse transmitted toward said body, automatically functions to send an answering pulse, either on the same frequency as said transmitted pulse or on a different frequency.

It is believed that the construction and operation of my new PPI radio locator will be apparent from the foregoing description. It should be understood nevertheless that while I have shown and described my invention in one preferred form, many changes and modifications may be made without departing from the spirit of my invention as sought to be defined in the following claims.

I claim:

1. In the method of determining the locations of objects by means of a pulse-echo radio system provided with first and second antennas, each of which has a principal lobe, the direction of the axis of the principal lobe of said first antenna being separated from the direction of the axis of the principal lobe of said second antenna by a given angle, and a single display screen for indicating said locations, the steps which include: generating a first sweep deflection, pointing said first sweep deflection in a direction corresponding to the direction of the lobe axis of said first antenna by reproducing said first deflection along a first portion of said screen, displaying the echoes corresponding to the locations of all objects detected by said first antenna along said first deflection, generating a second sweep deflection, pointing said second deflection in a direction corresponding to the direction of the lobe axis of said second antenna by reproducing said second deflection along a second portion of said screen angularly displaced from said first portion by said given angle, and displaying the echoes corresponding to the locations of all objects detected by said second antenna along said second sweep deflection.

2. In the method of determining the locations of objects by means of a pulse-echo radio system provided with first and second directional antennas pointing in diametrically opposite directions with the axes of their lobes, said antennas being connected through two receiving channels to a common plan position indicator, those steps which include: generating a first radius vector in said indicator in the direction of the lobe axis of said first antenna, displaying the instantaneous locations of the objects detected by said first antenna along said first radius vector, generating a second radius vector in said indicator in the direction of the lobe axis of said second antenna, and displaying the instantaneous locations of the objects detected by said second antenna along said second radius vector.

3. In the method of determining the location of objects as defined in claim 2 which includes an additional step of generating said first and second vectors in alternate succession.

4. In the method of determining the location of objects as defined in claim 2 which includes an additional step of generating said first vector in terms of time so that it coincides with the reception of echoes only from the objects whose ranges are within the limits of the remote portion of the lobe of said first antenna.

5. In the method of determining locations of objects by means of a radio pulse-echo object locating system having first and second directional antennas rotated in a horizontal plane and connected to a common plan position indicator, said indicator being capable of reproducing said locations in terms of range and azimuth along a polar coordinate system, the steps which include: generating a first radius vector in said indicator, rotating said first vector in synchronism and in space-phase with the rotation of said first antenna for pointing said first vector in the direction of the lobe axis of said first antenna, intensity modulating said first vector by means of a first set of echo signals, received by said first antenna, for reproducing along said first vector azimuth and range of objects producing said first set of echo signals, generating a second radius vector in said indicator, rotating said second vector in synchronism and in space-phase with the rotation of said second antenna for pointing said second vector in the direction of the lobe axis of said second antenna, and intensity modulating said second vector by means of a second set of echo signals, received by said second antenna, for reproducing along said second vector azimuth and range of objects producing said second set of echo signals.

6. In the method of determining locations of objects as defined in claim 5 which includes the additional step of varying the time of occurrence of said second vector for selecting any desired portion of the range assigned to said second antenna.

7. The method of measuring distance and azimuth of objects producing radio echoes in response to transmitted exploratory pulses in a form of radio energy by means of a single plan position indicator having a fluorescent screen, which includes the steps of radiating periodically a first series of exploratory radio pulses in a first direction toward a first set of reflecting objects, receiving a first series of echoes of said pulses from said first set of objects, generating, on said screen, a first sweep trace having a first sweep rate along a direction corresponding to said first direction to provide a first polar coordinate system, producing visual images of said first series of echoes along said first polar coordinate system, the radial distance and the angular position of said images along said coordinates representing respectively the range and azimuth of said objects, radiating periodically a second series of exploratory radio pulses in a predetermined sequence with respect to said first series of pulses in a second direction displaced from said first series by a given angle toward a second set of reflecting objects, receiving a second series of echoes of said second pulses from said second set of objects, substantially simultaneously generating, on said screen, a second sweep trace having a second sweep rate along a direction displaced from the direction of said first sweep trace by said given angle to provide a second polar coordinate system having common origin with said first polar coordinate system, producing a second set of visual images of said second series of echoes along said second polar coordinate system, the radial distance and the angular position of said second set of images along said second polar coordinate system representing the range and azimuth respectively of said second set of objects.

8. In the method of determining range and azimuth of objects by means of a radio object locating system connected to a plan position indicator having an image-producing screen, said indicator reproducing locations of said objects on said screen along polar coordinate systems, the steps which include: simultaneously transmitting first and second directional exploratory pulses in two different directions and receiving first and second series of echoes in response to said pulses, generating a first radius vector pointing in the direction of said first series of echoes, generating visual images of said first series of echoes along said first vector while suppressing said second series of echoes, simultaneously transmitting third and fourth directional exploratory pulses in two different directions a predetermined time after the transmission of said first and second pulses and receiving third and fourth series of echoes in response to said third and fourth pulses, generating a second radius vector pointing in the direction of said fourth series of echoes and generating visual images of said fourth series of echoes, on said screen, along said second radius vector having the same origin as said first vector while suppressing said third series of echoes.

9. In a biradial oscilloscope connected to two transmitters and two receivers, the method of timing oscilloscope circuits which includes the steps of: generating keying pulses, simultaneously transmitting two exploratory signals in two different directions in response to each keying pulse, generating first and second rectangular waves, said first wave being synchronized with the odd number of said pulses, and said second wave being synchronized with the even number of said pulses, generating a first sweep wave in synchronism with said first rectangular wave, generating a second sweep wave in synchronism with said second rectangular wave, and selecting the echoes of only one exploratory signal at any given time in alternate succession first by means of said first rectangular wave, and then by means of said second rectangular wave, said first rectangular wave selecting echoes emanating from one direction and said second rectangular wave selecting echoes emanating from the other direction.

10. A radio object-locating system including a modulator; first and second transmitters simultaneously keyed by said modulator; an antenna system rotatable in azimuth and having a radiation pattern covering a given elevation angle, said antenna system including a first directional antenna having a principal lobe which covers only a first portion of said given elevation angle and a second directional antenna having a principal lobe which covers substantially only the remaining portion of said elevation angle, said lobes being spaced in azimuth by a predetermined angle; first and second receivers connected respectively to said first and second antennas; a cathode ray tube indicator having a screen; and control means coupling said antenna system and said first and second receivers to said indicator for presenting during spaced intervals a first composite display of the range and azimuth of signals received by said first antenna on said screen, and for presenting during intervals intermediate said spaced intervals a second composite display of the range and azimuth of signals received by said second antenna on said screen, said control means including means for alternately blocking said receivers and for simultaneously shifting the azimuth indications of the respective displays by an amount representative of said predetermined angle.

11. A radio object-locating system including a common modulator, first and second transmitters simultaneously keyed by said modulator, first and second directional antennas connected respectively to said first and second transmitters, said first and second antennas being arranged to have principal lobes lying in a vertical plane, the axis of the principal lobe of said first antenna having a relatively small angle of elevation and the axis of the principal lobe of said second antenna having a relatively large angle of elevation, first and second receivers connected respectively to said first and second antennas, and a common plan position cathode ray tube indicator connected to said first and second receivers, said indicator having a screen for reproducing thereon signals from said receivers; which further includes a common support for said antennas, said antennas being mounted on said support with the lobe axes of said antennas pointing in diametrically opposite directions, means for rotating said support, a rotating yoke for electromagnetically deflecting the cathode-ray beam in said indicator, and electro-mechanical connections between said means and said yoke for rotating the magnetic axis of said yoke in synchronism and in space-phase with the lobe axes of said antennas.

12. A radio object-locating system including a common modulator, first and second transmitters simultaneously keyed by said modulator, first and second directional antennas connected respectively to said first and second transmitters, said first and second antennas being arranged to have principal lobes lying in a vertical plane, the axis of the principal lobe of said first antenna having a relatively small angle of elevation and the axis of the principal lobe of said second antenna having a relatively large angle of elevation, first and second receivers connected respectively to said first and second antennas, and a common plan position cathode ray tube indicator connected to said first and second receivers, said indicator having a screen for reproducing thereon signals from said receivers, wherein the principal lobes of said first and second antennas are separated in azimuth by a given angle, and which further includes a cathode-ray deflecting means connected to said indicator, and two sweep generating channels connected between said modulator and said deflecting means, one of said channels impressing a sweep voltage on said means deflecting the cathode ray beam of said indicator in the direction of the lobe axis of said first antenna, and the other channel impressing a sweep voltage on said means deflecting said cathode ray beam in the direction of the lobe axis of said second antenna.

13. A radio object-locating system including a common modulator, first and second transmitters simultaneously keyed by said modulator, first and second directional antennas connected respectively to said first and second transmitters, said first and second antennas being arranged to have principal lobes lying in a vertical plane, the axis of the principal lobe of said first antenna having a relatively small angle of elevation and the axis of the principal lobe of said second antenna having a relatively large angle of elevation, first and second receivers connected respectively to said first and second antennas, and a common plan position cathode ray tube indicator connected to said first and second receivers, said indicator having a screen for reproducing thereon signals from said receivers, wherein the principal lobes of said first and second antennas are separated in azimuth by a given angle, and which further includes a cathode-ray deflecting means connected to said indicator, two sweep generating channels connected between said modulator and said deflecting means, said modulator so controlling said channels that one of said sweep channels deflects the cathode-ray beam of said indicator in the direction of the lobe axis of said first antenna, and the other channel deflects said beam in the direction of the lobe axis of said second antenna, and connections between one of said sweep channels and said first receiver, and the other sweep channel and said second receiver, for blocking the output of one receiver at a time whereby the output of the first receiver is reproduced along one sweep, and the output of the second receiver is reproduced along the other sweep.

14. A radio object-locating system including a common modulator, first and second transmitters simultaneously keyed by said modulator, first and second directional antennas connected respectively to said first and second transmitters, said first and second antennas being arranged to have principal lobes lying in a vertical plane, the axis of the principal lobe of said first antenna having a relatively small angle of elevation and the axis of the principal lobe of said second antenna having a relatively large angle of elevation, first and second receivers connected respectively to said first and second antennas, and a common plan position cathode ray tube indicator connected to said first and second receivers, said indicator having a screen for reproducing thereon signals from said receivers, wherein the principal lobes of said first and second antennas are separated in azimuth by a given angle, and which further includes a cathode ray deflecting means connected to said indicator, two sweep generating channels connected between said modulator and said deflecting means, said modulator so controlling said channels that one of said sweep channels deflects the cathode ray beam of said indicator in the direction of lobe axis of said first antenna, and the other channel deflects said beam in the direction of the lobe axis of said second antenna, first and second electronic switches connected respectively to the outputs of said first and second receivers, a common video channel connected on its input side to said electronic switches and on its output side to said indicator, connections between one of said sweep generating channels and said first electronic switch, and the other sweep channel and said second electronic switch, for alternately blocking the outputs of said receivers whereby the output of the first receiver is reproduced along one sweep and the output of the second receiver is reproduced along the other sweep.

15. A radio object locating system as defined in claim 10 wherein said position indicator comprises a cathode ray beam generator and which further includes a range marker channel connected between said modulator and a mixer stage, said mixer stage being also connected on its input side to said first and second receivers and on its output side to said indicator, said mixer stage intensity modulating the cathode ray beam in said indicator for producing visual indications of the range markers and of the echoes received by said first and second receivers on the screen of said indicator.

16. A radio object locating system for determining range and azimuth of objects producing echoes in response to exploratory pulses including: a common modulator, first and second transmitters connected to said modulator, said transmitters being simultaneously keyed by said modulator, first and second directional antennas connected respectively to said first and second transmitters, said antennas being so mounted that the lobe axes of said antennas point in diametrically opposite directions whereby said antennas transmit exploratory pulses in two diametrically opposite directions, first and second duplexing circuits, and first and second receivers connected to said first and second antennas respectively, said first receiver being capable of receiving echoes of the exploratory pulses transmitted by said first antenna, and said second receiver being capable of receiving echoes of the exploratory pulses transmitted by said second antenna, first and second sweep generating channels generating a series of positive and negative voltage waves in a predetermined relationship with respect to said exploratory pulses, a cathode ray tube, a rotatable electromagnetic deflection coil rotatively mounted with respect to said cathode ray tube, means for synchronously rotating said antennas and said coil, connections between said first and second sweep channels and said coil whereby said sweep channels alternately impress upon said coil first the positive voltage wave and then the negative voltage wave for generating a rotating, bi-radial sweep pattern on the screen of said tube, and connections between said first and second receivers and said cathode ray tube for intensity modulating the cathode ray in said tube so as to reproduce on the screen of said tube the output of the first receiver along one sweep, and the output of the second receiver along the other sweep.

17. A system according to claim 10, wherein said control means further includes a first sweep deflection channel providing said first display and a second sweep deflection channel providing said second display, and said second channel includes means for variably delaying the relative occurrence in time of the output of said second channel relative to said first channel.

18. A system according to claim 10, further including a circuit, connected to be controlled by said modulator and having a connection to said indicator for control thereof, for generating range marker signals, for application to and for scaling of said indicator.

WILLIAM A. HUBER.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,227,598 | Lyman et al. | Jan. 7, 1941 |
| 2,275,016 | Koch | Mar. 3, 1942 |
| 2,324,314 | Michel | July 13, 1943 |
| 2,395,966 | Goldberg | Mar. 5, 1946 |
| 2,430,307 | Smith | Nov. 4, 1947 |
| 2,449,976 | Busignies | Sept. 28, 1948 |
| 2,468,032 | Busignies | Apr. 26, 1949 |
| 2,515,178 | Barchok | July 18, 1950 |